(12) United States Patent
Randhawa et al.

(10) Patent No.: US 9,077,580 B1
(45) Date of Patent: Jul. 7, 2015

(54) SELECTING PREFERRED NODES FOR SPECIFIC FUNCTIONAL ROLES IN A CLUSTER

(75) Inventors: Amarinder Singh Randhawa, Sunnyvale, CA (US); Prasanta Dash, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 163 days.

(21) Appl. No.: 13/442,789

(22) Filed: Apr. 9, 2012

(51) Int. Cl.
    *G06F 15/16*     (2006.01)
    *H04L 29/06*     (2006.01)
    *G06F 3/06*     (2006.01)

(52) U.S. Cl.
    CPC .............. *H04L 29/06* (2013.01); *G06F 3/0601* (2013.01); *G06F 3/067* (2013.01)

(58) Field of Classification Search
    USPC ................................................. 709/230, 223
    See application file for complete search history.

(56) References Cited

U.S. PATENT DOCUMENTS

| | | | |
|---|---|---|---|
| 6,757,836 B1 * | 6/2004 | Kumar et al. ................... | 714/4.1 |
| 7,631,034 B1 * | 12/2009 | Haustein et al. ............... | 709/201 |
| 2002/0059429 A1 * | 5/2002 | Carpenter et al. ............. | 709/227 |
| 2003/0140108 A1 * | 7/2003 | Sampathkumar ............. | 709/208 |
| 2008/0222642 A1 * | 9/2008 | Kakarla et al. ................ | 718/104 |

OTHER PUBLICATIONS

"Master Selection Policies for Inter-destination Multimedia Synchronization in Distributed Applications," 2 pages. MASCOTS IEEE 19th International Symposium in Singapore, Jul. 25-27, 2011.

Packets Analyzed Blog, Fortinet-HA Master Selection, Dec. 13, 2011, 5 pages. http://packetsanalyzed.blogspot.com/2011/12/fortinet-ha-master-selection.html.

Oracle Solaris, Man Pages Section 1M: System Administration Commands, VRRP administration tool, 9 pages. Oracle Corporation, 2011. http://docs.oracle.com/cd/E23824_01/html/821-1462/vrrpadm-1m.html.

Question and Answers Concerning Leader Election Algorithm, Stack Overflow, Jan. 2, 2011, 2 pages. http://stackoverflow.com/questions/4706959/leader-election-algorithm.

B. Lee, C. Yu, and S. Moh, "Issues in Scalable Clustered Network Architecture for Mobile Ad Hoc Networks," 27 pages. *The Mobile Computing Handbook*, CRC Press, 2005.

* cited by examiner

*Primary Examiner* — Michael Won
*Assistant Examiner* — Hermon Asres
(74) *Attorney, Agent, or Firm* — Brill Law Office; Jeffrey Brill

(57) ABSTRACT

A preferred node is selected for a specific functional role in a cluster. Dynamic and static parameters concerning the nodes are measured, including connectivity to shared storage. A user preference value is gleaned for each node, quantifying the user's preference of each corresponding node for the functional role. A preference rating is calculated for each node, based on the measured parameters and the gleaned user preference value. The preference rating indicates the node's suitability for the specific functional role, relative to the other nodes. Connectivity to shared storage in the cluster can be weighted more heavily than other parameters. Examples of specific functional roles in the cluster include becoming the master node, becoming a failover target for a specific application, or remaining in operation with access to shared cluster storage, in response to an occurrence of split brain.

20 Claims, 4 Drawing Sheets

SELECTING PREFERRED NODES FOR SPECIFIC FUNCTIONAL ROLES IN A CLUSTER

TECHNICAL FIELD

This disclosure pertains generally to computer cluster management, and more specifically to selecting a preferred node for a specific functional role in a cluster.

BACKGROUND

In computer storage, logical volume management is a flexible method of allocating space on mass-storage devices. In particular, a volume manager can concatenate, stripe together or otherwise combine underlying physical partitions into larger, virtual ones. An administrator can then re-size or move logical volumes, potentially without interrupting system use.

A cluster is a group of computers (nodes) that uses groups of redundant computing resources in order to provide continued service when individual system components fail. More specifically, clusters eliminate single points of failure and provide parallel access to shared resources by having multiple servers, multiple network connections, redundant data storage, etc.

A cluster volume manager extends volume management across the multiple nodes of a cluster, such that each node recognizes the same logical volume layout, and the same state of all volume resources at all nodes. Under cluster volume management, any changes made to volume configuration from any node in the cluster are recognized by all the nodes of the cluster.

Many cluster volume management protocols are master-slave in nature. For example, in an asymmetric storage configuration, commands to change the shared storage configuration are sent to the master node. The master node executes changes to the shared storage configuration, and propagates the changes to the slave nodes in the cluster.

When the master node leaves the cluster, another node in the cluster is selected to become the new master. Conventionally, the logic used to select the new master node is typically simplistic (e.g., select the next node ID, select the node with the lowest ID, etc.) and sometimes static (e.g., administrator manually defines node to become next master, etc.). However, selecting an appropriate master is critical, and a poor selection may lead to a number of serious problems.

If full or partial connectivity to underlying storage is lost from the new master node, the new master would be unable to serve any master-slave protocol that depends upon the access to storage from the master node. Thus, all such protocols would be disabled cluster-wide. Additionally, if the computational resources (e.g., central processing unit ("CPU") capacity, network bandwidth, storage bandwidth, etc.) on the new master node are not sufficient, performance issues may result affecting all dependent master-slave protocols. Furthermore, nodes with certain characteristics should not be selected as master nodes in the first place. Some examples include a node that is not centrally located geographically (e.g., a node in an off-shore data center as opposed to corporate headquarters), a node with constraints regarding which applications it can serve, and a node specifically designated by an administrator as not being suitable for use as a master (based on, e.g., experience or subjective knowledge). In a conventional selection methodology in which a new master node is selected based on, e.g., node ID, a node with any of these properties could be selected as the master.

It would be desirable to address these issues.

SUMMARY

One or more preferred nodes are selected for a specific functional role in a cluster. Dynamic and static parameters are measured for each one of a plurality of nodes. One dynamic parameter that is measured is connectivity to shared storage in the cluster. This can be measured, for example, by determining a total number of disks in the shared storage of the cluster, and determining how many or what percentage or proportion of the total number of disks are visible to the specific node. Other dynamic parameters that can be measured include factors that can change at run time such as currently available network bandwidth, currently available memory, currently available central processing unit capacity, and current load. Measured static parameters can include factors that do not change at run time, such as system configuration, central processing unit capacity, memory capacity, capacity of attached storage, network capacity, and physical location. A user preference value is received or otherwise gleaned for each one of the plurality of nodes. A user preference value can be provided by a user such as an administrator, for example via a graphical user interface, a command line, a configuration file, an environment variable, etc. User preference values quantify the user's preference of each corresponding node for the specific functional role in the cluster, relative to the other nodes of the plurality. In some embodiments, user preference values are automatically set to a default value (e.g., 0), which can be edited or overwritten by users for individual nodes. This enables a user to supply specific user preference values for one or more specific nodes, and have the default value used for the rest.

A preference rating is calculated for each one of the plurality of nodes, based on the measured parameters and the user preference value for the corresponding node. The preference rating for each specific node indicates its suitability for the specific functional role in the cluster, relative to the other nodes of the plurality. Weights can be applied to the measured parameters concerning nodes, such that the applied weights affect the relative consequence of the corresponding measured parameters in calculating preference ratings for the nodes. In one embodiment, connectivity to shared storage in the cluster is weighted more heavily than any other parameter. In some embodiments, respective weights are given to measured parameters and user preference values such that the user can enter a sufficiently large user preference value for a node so as to override all measured parameters concerning that node.

In one embodiment, when it is determined that it is time to select at least one preferred node to perform the specific functional role in the cluster, the parameters concerning nodes are measured, and the user preference values concerning nodes are gleaned. The preference rating for each one of the plurality of nodes is calculated, and one (or more) specific node(s) of the plurality is/are appointed to perform the specific functional role in the cluster, responsive to the calculated preference ratings indicating that the one or more specific node(s) is/are best suited for that purpose, relative to the other nodes of the plurality.

In one embodiment, the specific functional role in the cluster is becoming master node, for example when an existing master node leaves the cluster. In this embodiment, a specific node is appointed to be the master node in the cluster, responsive to the calculated preference ratings indicating that the specific node is best suited for that purpose, relative to the other nodes of the plurality. In another embodiment, the specific functional role in the cluster comprises becoming a failover target for a specific application. In this embodiment, a specific node is selected to be a failover target for the specific application, responsive to the calculated preference ratings indicating that the specific node is best suited for that purpose. The specific application can then be failed over to the selected node. Another example of a specific functional role in the cluster is remaining in operation with access to shared cluster storage, in response to an occurrence of split brain.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
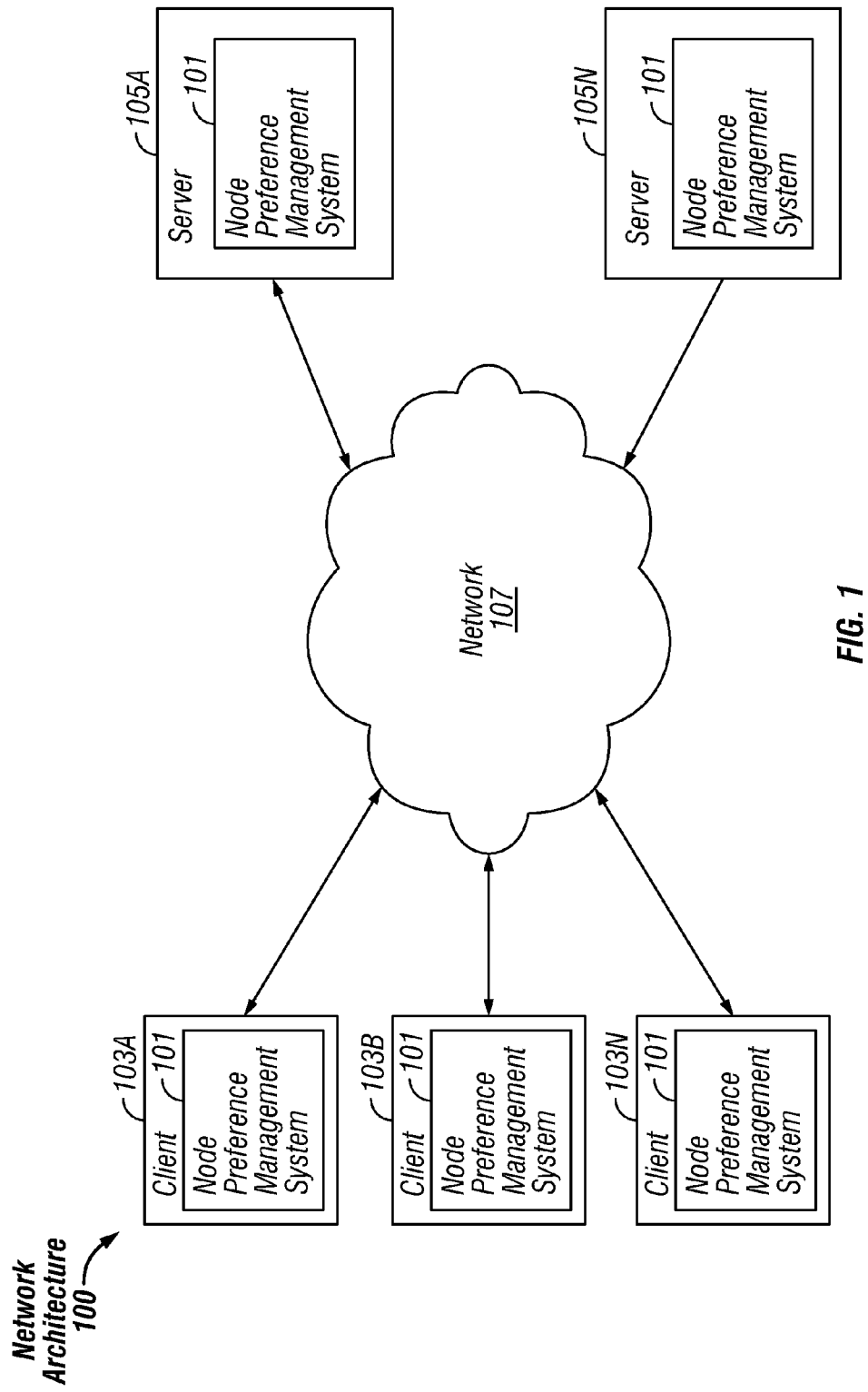
FIG. 1 is a block diagram of an exemplary network architecture in which a node preference management system can be implemented, according to some embodiments.

FIG. 1 is a block diagram illustrating an exemplary network architecture 100 in which a node preference management system 101 can be implemented. The illustrated network architecture 100 comprises multiple clients 103A, 103B and 103N, as well as multiple servers 105A and 105N. In FIG. 1, a node preference management system 101 is illustrated as residing on each server 105 and each client 103. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
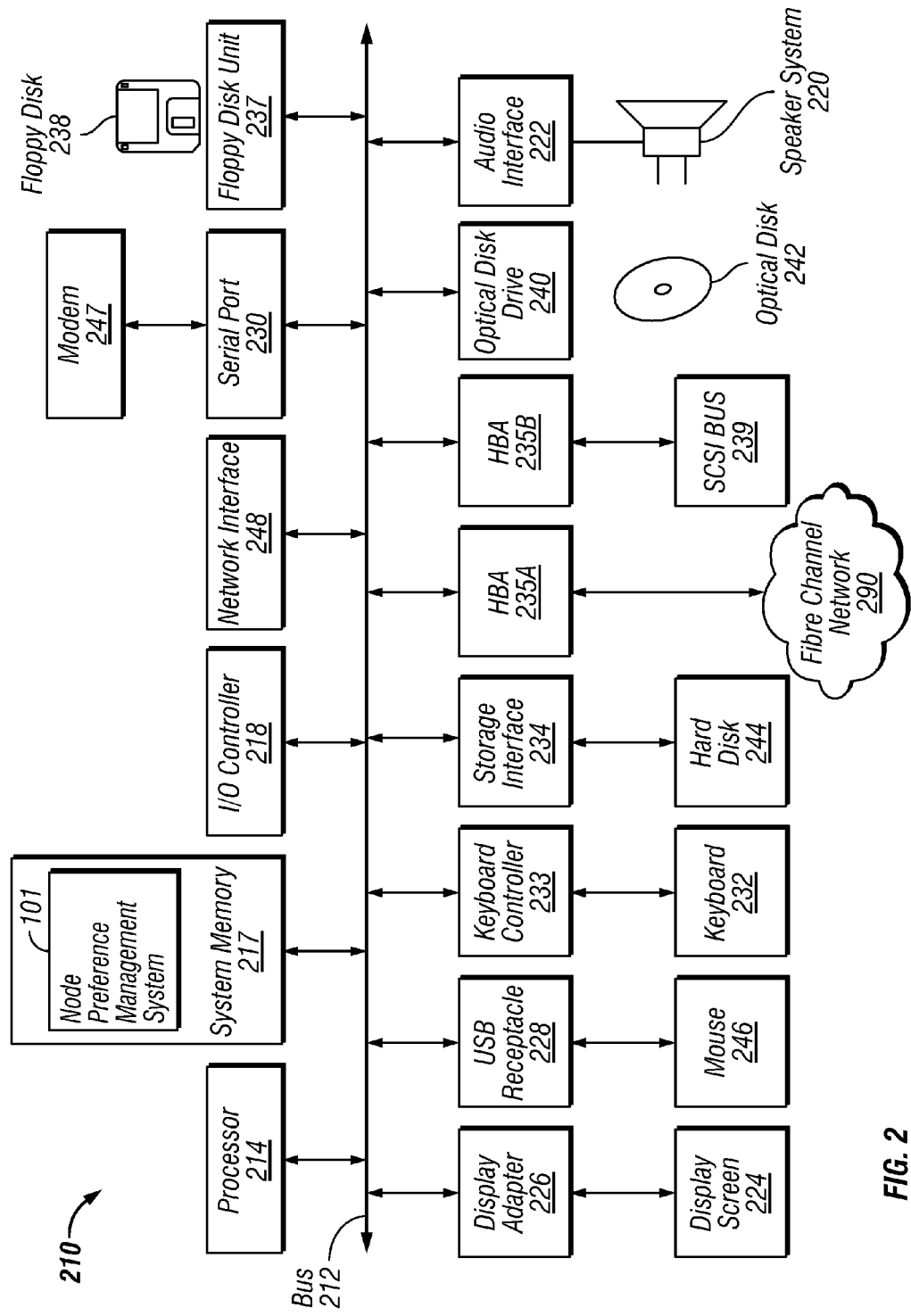
FIG. 2 is a block diagram of a computer system suitable for implementing a node preference management system, according to some embodiments.

FIG. 2 is a block diagram of a computer system 210 suitable for implementing a node preference management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the node preference management system 101 is illustrated as residing in system memory 217. The workings of the node preference management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
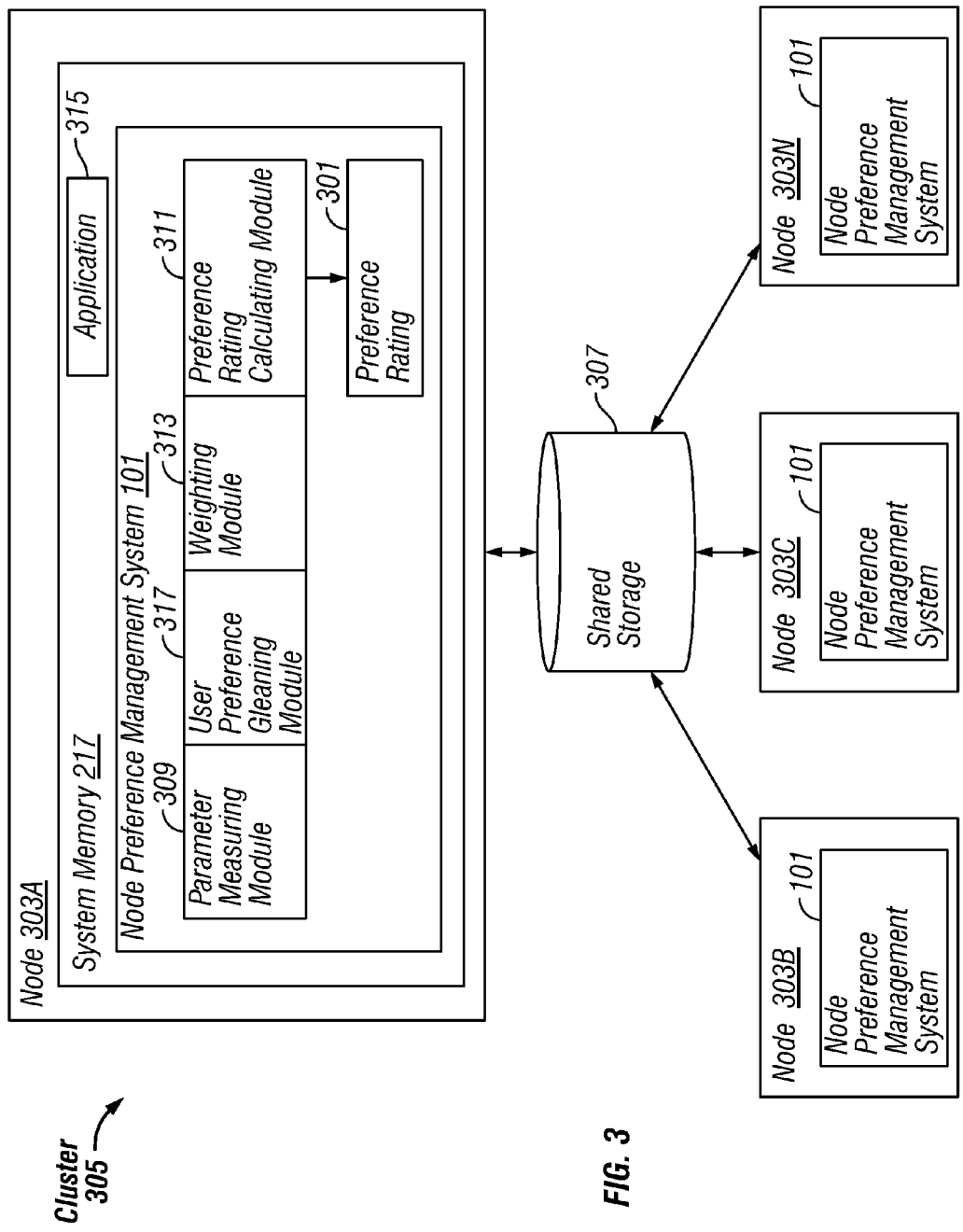
FIG. 3 is a block diagram of the operation of a node preference management system, according to some embodiments.

FIG. 3 illustrates the operation of a node preference management system 101, according to some embodiments. As described above, the functionalities of the node preference management system 101 can reside on a client 103, a server 105, or be distributed between multiple computer systems 210, including within a cloud-based computing environment in which the functionality of the node preference management system 101 is provided as a service over a network 107. It is to be understood that although the node preference management system 101 is illustrated in FIG. 3 as a single entity, the illustrated node preference management system 101 represents a collection of functionalities, which can be instantiated as a single or multiple modules as desired (an instantiation of specific, multiple modules of the node preference management system 101 is illustrated in FIG. 3).

For clarity of illustration, FIG. 3 depicts a cluster 305 comprising four nodes 303, nodes 303A, 303B, 303C and 303N. It is to be understood that in practice clusters 303 can be orders of magnitude larger than the one illustrated in FIG. 3. Also for clarity of illustration, a node preference management system 101 is depicted as residing on each illustrated node 303 of the cluster 305, with the specific modules of the node preference management system 101 residing on node 303A illustrated in detail. In practice the node preference management system 101 can be distributed across multiple nodes 303 of the cluster 305 as desired. In one embodiment, the node preference management system 101 is illustrated as a component of a cluster volume manager (not illustrated), with an instance on each node 303 of the cluster 305.

It is to be understood that the modules of the node preference management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the node preference management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a node preference management system 101 calculates a preference rating 301 for each of a plurality of nodes 303 in a cluster 305 based on multiple factors, one of which is connectivity to shared storage 307. As explained in more detail below, other factors (e.g., network bandwidth, available memory, CPU capacity) can also be taken into account. As also discussed in detail below, a user (e.g., an administrator) can contribute to or override preference ratings 301, to account for factors that the node preference management system 101 cannot or does not glean automatically.

In one embodiment, the preference ratings 301 indicates the relative suitability of the various nodes 303 of the cluster 305 to become master node $303_{master}$ when a current master node $303_{master}$ leaves the cluster 305. As explained in detail below, in other embodiments the preference ratings 301 can indicate the suitability of the nodes 303 for other functionalities in the cluster 305, such as which nodes 303 are preferred as failover targets, or which nodes should survive detected split-brain scenarios.

Factors that account for node specific characteristics are used to calculate a preference rating 301 for each or a plurality nodes 303. Both static and dynamic parameters can be taken into account, as well as user preference concerning specific nodes 303 of types of nodes 303. As described below, these factors can be weighted as desired. Embodiments in which preference ratings 301 indicate suitability to become the new master node $303_{master}$ are discussed first, and other embodiments are discussed subsequently. In an embodiment in which preference ratings 301 are used to select master nodes $303_{master}$, when a new master node $303_{master}$ is to be selected, the relative preference ratings 301 of the nodes 303 can be compared to find the node 303 most suitable to take the role of master $303_{master}$.

As illustrated in FIG. 3, a parameter measuring module 309 of the node preference management system 101 measures each node's connectivity to the shared storage 307 of the cluster 305. Although in theory each node 303 of a cluster 305 should have the same view of the shared storage 307, in practice this varies between nodes 303 as storage media (e.g., disks, tape drives) and interconnection components (e.g., switches, routers) fail and are brought up over time. Thus, the storage connectivity of a given node 303 is a dynamic parameter, which varies over time. The storage connectivity of a given node 303 can be measured based on the total number of disks in the shared storage 307 of the cluster 305, and how many (or what percentage or proportion) of these disks are and/or are not visible to the given node 303.

The storage connectivity of a node 303 is an important factor in determining whether the node is suitable for use as a master $303_{master}$ (or in other capacities as explained below), and can be weighted as the primary factor in calculating the node's preference rating 301. The weighting of various factors and the calculation of preference ratings 301 is described in detail below.

The parameter measuring module 309 also measures other dynamic parameters of the nodes 303. Other dynamic parameters that are measured and used in the calculation of a node's preference rating 301 can include network bandwidth, currently available (as opposed to installed) memory, currently available CPU, currently available storage, current load, and/or other factors which continue to change at run time. The specific dynamic node parameters to measure can vary between embodiments, depending upon, for example, what factors are considered important in choosing the most suitable node 303 for the purpose in question (e.g., suitable to be a master node $303_{master}$, suitable for as a failover target, etc.).

Because dynamic parameters vary over time, in one embodiment, the parameter measuring module 309 does not measure dynamic parameters until it is actually time to use node preference ratings 301 to determine a most preferred node 303 (e.g., appoint a new master node $303_{master}$). In other embodiments, specific ones or all of the dynamic parameters are measured ahead of time, for example at regular intervals. This can be done, for example, to avoid latency at preferred node determination time (e.g., when executing the master takeover protocol). For example, specific dynamic parameters which cannot be measured quickly, or for which the associated weights (described below) cannot be calculated quickly, can be measured prior to, e.g., the appointment of a new master node $303_{master}$.

In one embodiment, any periodic measuring of parameters prior to the determination of a preferred node 303 can be performed asynchronously by a specific node 303, without exchanging this information across the cluster 305. In another embodiment, the information can be tracked synchronously by all the nodes 303 of the cluster 305. In some embodiments, nodes 303 do not exchange the identity of the specific node 303 determined to be preferred, but instead exchange the values of the parameters that are used to make such a determination. Exchanging such parameter based information can enable other functionality at a node 303 level. For example, by knowing which nodes 303 have access to which disks 244, a target for I/O shipping can be selected.

The parameter measuring module 309 also measures static node parameters to be used in calculating preference ratings 301. Static node parameters are factors that do not change at run time, such as system configuration, CPU/memory capacity, capacity of attached storage, network capacity, etc. As with dynamic parameters, the specific static parameters to measure can vary between embodiments. Static parameters can be measured at preferred node determination time, or ahead of time, for example when the cluster 305 is brought up, or when a new node 303 joins the cluster 305.

The parameter measuring module 309 can convert its raw measured values for the various dynamic and static parameters into numerical values within a common range, so that the multiple measured values can be meaningfully utilized in the calculation of a single preference rating 301 for each node 303. The specific numerical values, format and range used are variable design parameters. For example, the storage connectivity parameter for each node 303 could default to a given positive value, from which a specific value is subtracted for each disk (or other unit of storage) that is not visible from the given node 303. As another example, measured CPU capacity could be represented as a number within a specific range, with higher numbers indicating more capacity.

A weighting module 313 of node preference management system 101 can weigh the different parameters as desired, with different weighting values being applied to different parameters in different embodiments, depending on the importance given to the various factors in the calculation of node suitability for the purpose being determined, such as selection of a new master node $303_{master}$. In other words, weights can be applied to measured parameters concerning nodes 303, and the applied weights affect the relative consequence of the corresponding measured parameters in calculating preference ratings 301. The weights applied to each of the parameters may increase or decrease the preference of the node 303 (i.e., weigh the parameter up or down) by a specific variable value (e.g., −x, +x) or constant value (e.g., min or max, as pre-defined to be specific values).

Different weights can be applied to different parameters depending upon what results are desired. For example, in data replication, in which data is shared so as to ensure consistency between redundant storage resources, the master/logowner node plays a pivotal role as most of the log update requests are handled by this node 303. Therefore, replication performance (as well as overall I/O throughput) can be enhanced by weighting network bandwidth as a relatively important one of the dynamic parameters. As another example, physical location can be leveraged as a static parameter to favor replacing an outgoing master node $303_{master}$ with a new master node $303_{master}$ located within the same site (e.g., the primary site). To do so, more weight can be given to a particular site over others. In some embodiments, in addition to or instead of weighting, specific individual parameters are thresholded so that their impact does not exceed a particular value (and thus undermine the impact of other parameters).

Another factor used in calculating node preference ratings 301 is a user preference value, which quantifies a user's preference of specific nodes 303 over others, which can be based on factors that are apparent to the user, but are not necessarily captured automatically by the node preference management system 101. A user preference value gleaning module 317 of the node preference management system 101 gleans user preference values. In some embodiments, this comprises receiving user preference values from a user, such as an administrator. User preference values can be provided by users via a graphical user interface, a command line, a configuration file, an environment variable, etc. In some embodiments, the user assigns specific (e.g., numerical) values to specific nodes 303. In some embodiments, in lieu of or in combination with specific values, the user can specify labels such as "preferred" or "non-preferred." For example, a node 303 that is primarily used for backup or other ancillary tasks could be labeled as "non-preferred." These values can be automatically mapped to given, pre-configured numerical values which are assigned to the given nodes 303. This enables the administrator to easily apply the same bias to multiple nodes 303 in the cluster 305. In some embodiments, user preference values are automatically set to a default value such as 0. A user can edit or overwrite the default value for individual nodes 303 of interest, thereby allowing the user to supply specific user preference values for one or more specific nodes 303, and have the default value used for the rest of the nodes 303 in the cluster 305.

A preference rating calculating module 311 of the node preference management system 101 calculates a preference rating 301 for each node 303, as a function of measured dynamic and static parameters and the user preference value. The specific format and ranges of the numerical values used for the operands, weights and resulting node preference ratings 301 are variable design parameters.

In one embodiment, the weighted dynamic and static parameters can only influence the calculated preference rating within a band of variance (for example, −10000 to +10000). This can achieved by thresholding the preference rating that is being calculated within this range before accounting for the user preference value. This enables the user to specify sufficiently large bias values (relative to each other) to override any measured parameters and achieve full control over the determination of the most preferred node 303 (e.g., the selection of the new master node $303_{master}$). The administrator can, if desired, go so far as specifying the exact order of preference for each node 303 in the cluster 305 (e.g., the exact sequence of master takeover), by overriding the static and dynamic parameters with sufficiently large user preference values. In one embodiment, the preference rating 301 of each node 303 in the cluster 305 as calculated according to the formula in Table 1. The specific formula to use is a variable design parameter.

TABLE 1 preference rating = user preference value + threshold (sum of weighted dynamic parameters + sum of weighted static parameters)

It is to be understood that the node preference management system 101 enables user preference to be offset based on objective factors concerning nodes, as represented by the measured dynamic and static parameters. On the other hand, where so desired, the administrator can override these objective factors for one or more nodes 303, by specifying a bias value that is more than the maximum threshold value of the static and dynamic parameters.

Some embodiments allow for the presence of nodes 303 in a cluster 305 which are not measured for some or all dynamic and/or static parameters, due either to a deliberate administrator configuration decision, or to, e.g., upgrade and/or protocol limitations). Such nodes 303 can be automatically assigned a default preference rating 301 which can be pre-defined (e.g., 0), or determined by the node preference management system 101 at node preference rating determination time (e.g., at new master takeover) based on the preference rating 301 of other nodes 303 in the cluster 305 (e.g., the mean, the median, etc).

When a cluster event occurs that calls for node preference ratings 301 to be determined, the functionality described above is used to determine a node preference rating 301 for each node 303 of the cluster 305. The node(s) 303 best suited for the functional role for which the preferences are being determined as indicated by the preference ratings 301 is/are then given that role. In other words, in response to the node preference management system 101 determining that it is time to select one (or more) most preferred node(s) 303 to perform the specific functional role in the cluster 305, the node parameters are measured, the user preference values are gleaned (e.g., received from a user, read from a configuration file, default values used, etc.), and the preference ratings 301 are calculated. The node(s) 303 best suited to perform the specific functional role as indicated by the calculated preference ratings 301 is then appointed to perform the role in the cluster 305. For example, in the case of new master takeover, each node 303 is assigned a preference rating 301 indicating its suitability to become the new master node $303_{master}$ and the node 303 with the highest preference rating 301 becomes the next master $303_{master}$.

It is to be understood that the above-described functionality can be used to change master nodes $303_{master}$ even where the current master $303_{master}$ is not leaving the cluster 305. If it is desired to switch the role of master $303_{master}$ to a new node 303 without the previous master node $303_{master}$ leaving the cluster 305, the above-described functionality can be used to determine preference ratings 301 for all the nodes 303 in the cluster 305 except the current master node $303_{master}$. Thus the administrator can specify that the current master node $303_{master}$ should relinquish the role of master $303_{master}$ and a new master $303_{master}$ is selected based on the current preference ratings 301. If the administrator wishes to make a specific node 303 the new master $303_{master}$ (e.g., a node 303 running a specific application, or a node 303 in a specific role within the cluster 305), the administrator can provide user preference values to ensure this result.

It is to further be understood that in other embodiments, the node preference management system 101 can be used to select one or more nodes 303 in a cluster 305 that are more/most suitable for roles other than that of master node $303_{master}$. For example, the dynamic and storage parameters concerning nodes 303 to be measured can be set so as to determine which node 303 is preferred as the failover target for, e.g., an application 315 that requires a given level of access to the shared storage 307.

Addressing the scenario of failover target selection in greater detail, it is to be understood that high-availability clusters 305 (also known as HA clusters 305 or failover clusters 305) are groups of nodes 303 that support running server applications 315 with a minimum amount of down-time. In the absence of such a clustering module, if a server running a particular application 315 fails, the application 315 would be unavailable until the server is restored. In high-availability clustering, the failure of a server (or of a specific computing resource used thereby such as a network adapter, storage device, etc.) is detected. Steps are automatically taken to allow the application 315 that was being run on the failed server to remain available. This can be in the form of restarting the server and application 315, using a different network resource (e.g., network adapter), or automatically restarting the application 315 on another computing system (i.e., another node 303 of the cluster 305). This process is called "failover," and the node 303 on which the application 315 is restarted can be thought of as the target of the failover operation.

In an embodiment in which nodes 303 are rated to determine which are the preferred failover targets for a given application 315, the parameter measuring module 309 measures characteristics of the nodes 303 that the application 315 in question requires for its operation (e.g., for an application that is I/O intensive, good connectivity is important). Likewise, the administrator provides user preference values for the nodes 303 reflecting their preference or lack thereof as suitable failover targets for the specific application 315. The weighting module 313 can weigh the different parameters as desired, and the preference rating calculating module 311 calculates a preference rating 301 for each node 303, reflecting its relative suitability as a failover target. Based on the preference rating, the node 303 indicated as being best suited to become a failover target for the specific application is selected for that purpose. The application 315 can then be failed over to the selected node 303.

Another example of using the node preference management system 101 to select preferred nodes 303 is the scenario of resolving an occurrence of the split brain problem in the cluster 305. Split brain occurs when two independent systems in a cluster 305 (i.e., nodes 303 or groupings of nodes 303) become disconnected from each other, and each falsely assumes that the other is no longer running. This can result from the failure of interconnection components in the cluster 305. The resulting condition can be described as a "fence" existing between the nodes 303, wherein there is no communication through the fence. As a result, the node 303 on each side of the fence assumes it has exclusive access to resources, such as shared storage 307, possibly resulting in data corruption on the shared storage 307. To solve the problem of split brain, the node(s) 303 on one side of the fence or the other should be taken offline, or at least denied access to the shared storage 307. Thus, in this scenario, a decision needs to be made as to which side of the fence is to have its nodes 303 remain in operation (the preferred nodes 303) and which is to be taken down. The node preference management system 101 can be used to select the preferred nodes 303 automatically.

In an embodiment in which nodes 303 are rated to determine which are to remain operational in response to an occurrence of split brain, the parameter measuring module 309 measures characteristics of the nodes 303 on each side of the fence, based on the qualities that are desirable in a node 303 being given preference in a fencing scenario. Typically, this is connectivity to the most disks in the shared storage 307, but other factors can also be utilized as desired. The administrator can provide user preference values for the nodes 303 reflecting their preference or lack thereof in this context, the weighting module 313 can weigh the different parameters as desired, and the preference rating calculating module 311 calculates a preference rating 301 for each node 303, reflecting its relative suitability to be kept running with access to the shared storage 307 in light of the split brain occurrence. The node(s) 303 on the side of the fence with the collective lower preference can then be taken down, and the node(s) 303 on the side of the fence with the collective higher preference maintained.

Note that in some scenarios this can comprise selecting a preferred set of nodes 303 rather than an individual preferred node 303. The preference ratings 301 of the individual nodes 303 in each set can be analyzed and/or combined in a number of different ways to calculate a collective, set-level preference rating. For example, the set that contains the individual node 303 with the highest preference rating 301 can be chosen, the set with the highest sum of individual preference ratings 301 can be chosen, the set with the highest average, mean, mode or median can be chosen, etc. It is to be understood that preferred sets (e.g., sub-clusters) of nodes 303 can be selected in operational scenarios other than resolving an occurrence of the split brain problem in the cluster 305.

Figure 4:
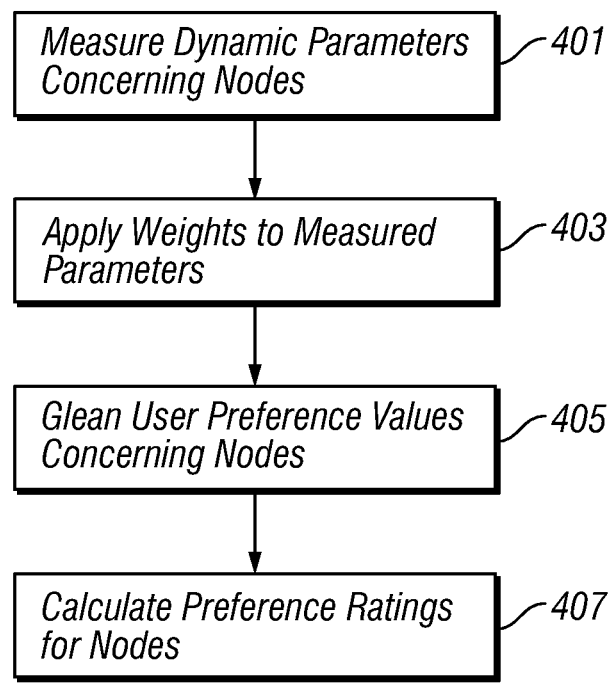
FIG. 4 is a flowchart of the operation of a node preference management system, according to some embodiments.

FIG. 4 is a flowchart illustrating the operation of a node preference management system 101, according to some embodiments. The parameter measuring module 309 measures 401 one or more dynamic parameter(s) for each one of a plurality of nodes 303. The weighting module 313 applies 403 weights to the measured parameters concerning the nodes 303, such that the applied weights affect the relative consequence of the corresponding measured parameters in calculating preference ratings 301. The user preference value gleaning module 317 gleans 405 a user preference value for each one of the plurality of nodes 303, quantifying the user's preference of each corresponding node 303 for the specific functional role in the cluster 305, relative to the other nodes 303. The preference rating calculating module 311 calculates 407 a preference rating 301 for each one of the plurality of nodes 303, based on the measured parameters and the user preference value for the corresponding node 303. The preference rating 301 for each specific node 303 indicates its suitability for the specific functional role in the cluster 305, relative to the other nodes 303 of the plurality.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for selecting at least one preferred node for a specific functional role in a cluster, the method comprising the steps of:
   measuring, for each one of a plurality of nodes, at least one dynamic parameter, wherein the at least one dynamic parameter comprises at least connectivity to shared storage in the cluster, wherein connectivity is measured by determining how many of a total number of disks in the shared storage of the cluster are visible to each of the plurality of nodes;
   gleaning, for each one of the plurality of nodes, a user preference value quantifying a preference of each corresponding node for the specific functional role in the cluster, relative to the other nodes of the plurality; and
   calculating a preference rating for each one of the plurality of nodes, based on at least the at least one measured dynamic parameter and the gleaned user preference value for the corresponding node, wherein the preference rating for each specific node indicates its suitability for the specific functional role in the cluster, relative to the other nodes of the plurality.

2. The method of claim 1 further comprising:
   measuring, for each one of the plurality of nodes, at least one static parameter; and
   calculating the preference rating for each one of the plurality of nodes, based on at least the at least one measured dynamic parameter, the at least one measured static parameter and the gleaned user preference value for the corresponding node.

3. The method of claim 2 wherein measuring at least one static parameter for a specific node further comprises:
   measuring at least one parameter for the specific node from a group consisting of: system configuration, central processing unit capacity, memory capacity, capacity of attached storage, network capacity, and physical location.

4. The method of claim 1 wherein the specific functional role in the cluster further comprises:
   becoming master node in the cluster.

5. The method of claim 4 further comprising:
   appointing a specific one of the nodes of the plurality to be the master node in the cluster, responsive to the calculated preference ratings indicating that the specific node is best suited to become the master node in the cluster, relative to the other nodes of the plurality.

6. The method of claim 1 wherein measuring connectivity to shared storage of a specific node further comprises:
   determining a total number of disks in the shared storage of the cluster; and
   determining a factor from a group of factors consisting of: a percentage of the total number of disks of the shared storage of the cluster that are visible to the specific node and a proportion of the total number of disks of the shared storage of the cluster that are visible to the specific node.

7. The method of claim 1 wherein calculating the preference rating for each one of the plurality of nodes further comprises:
   applying weights to measured parameters concerning nodes, the applied weights affecting relative consequence of corresponding measured parameters in calculating preference ratings.

8. The method of claim 7 wherein applying weights to measured parameters concerning nodes further comprises:
   weighting connectivity to shared storage in the cluster more heavily than any other parameter.

9. The method of claim 1 wherein calculating the preference rating for each one of the plurality of nodes further comprises:
   giving respective weights to measured parameters and gleaned user preference values such that a sufficiently large user preference value concerning a specific node overrides all measured parameters concerning the specific node.

10. The method of claim 1 wherein measuring at least one dynamic parameter for a specific node further comprises:
    measuring at least one dynamic parameter for the specific node from a group consisting of: currently available network bandwidth, currently available memory, currently available central processing unit capacity, and current load.

11. The method of claim 1 further comprising:
    determining that it is time to select at least one preferred node to perform the specific functional role in the cluster;
    in response to the determining step, 1) measuring the at least one dynamic parameter for each one of the plurality of nodes, 2) gleaning the user preference value, for each one of the plurality of nodes, and 3) calculating the preference rating for each one of the plurality of nodes; and
    appointing at least one specific node of the plurality to perform the specific functional role in the cluster, responsive to the calculated preference ratings indicating that the at least one specific node is best suited to perform the specific functional role, relative to the other nodes of the plurality.

12. The method of claim 1 wherein the specific functional role in the cluster further comprises:
   becoming a failover target for a specific application.

13. The method of claim 12 further comprising:
   selecting a specific one of the nodes of the plurality to be a failover target for the specific application, responsive to the calculated preference ratings indicating that the specific node is best suited to become a failover target for the specific application, relative to the other nodes of the plurality; and
   failing over the specific application to the node selected to be the failover target.

14. The method of claim 1 wherein the specific functional role in the cluster further comprises:
   remaining in operation with access to shared cluster storage in response to an occurrence of split brain.

15. A non-transitory computer readable medium storing a computer program product for selecting at least one preferred node for a specific functional role in a cluster, the non-transitory computer readable medium comprising:
   program code for measuring, for each one of a plurality of nodes, at least one dynamic parameter, wherein the at least one dynamic parameter comprises at least connectivity to shared storage in the cluster, wherein connectivity is measured by determining how many of a total number of disks in the shared storage of the cluster are visible to each of the plurality of nodes;
   program code for gleaning, for each one of the plurality of nodes, a user preference value quantifying a preference of each corresponding node for the specific functional role in the cluster, relative to the other nodes of the plurality; and
   program code for calculating a preference rating for each one of the plurality of nodes, based on at least the at least one measured dynamic parameter and the user preference value for the corresponding node, wherein the preference rating for each specific node indicates its suitability for the specific functional role in the cluster, relative to the other nodes of the plurality.

16. The non-transitory computer readable medium of claim 15 wherein the specific functional role in the cluster further comprises one functional role from a group of functional roles consisting of:
   becoming master node in the cluster;
   becoming a failover target for a specific application; and
   remaining in operation with access to shared cluster storage in response to an occurrence of split brain.

17. The non-transitory computer readable medium of claim 15 wherein the program code for measuring connectivity to shared storage of a specific node further comprises:
   program code for determining a total number of disks in the shared storage of the cluster; and
   program code for determining a factor from a group of factors consisting of: a percentage of the total number of disks of the shared storage of the cluster that are visible to the specific node and a proportion of the total number of disks of the shared storage of the cluster that are visible to the specific node.

18. The non-transitory computer readable medium of claim 15 wherein the program code for calculating the preference rating for each one of the plurality of nodes further comprises:
   program code for applying weights to measured parameters concerning nodes, the applied weights affecting relative consequence of corresponding measured parameters in calculating preference ratings; and
   program code for weighting connectivity to shared storage in the cluster more heavily than any other parameter.

19. The non-transitory computer readable medium of claim 15 further comprising:
   program code for determining that it is time to select at least one preferred node to perform the specific functional role in the cluster;
   program code for, in response to the determining, 1) measuring the at least one dynamic parameter for each one of the plurality of nodes, 2) gleaning the user preference value, for each one of the plurality of nodes, and 3) calculating the preference rating for each one of the plurality of nodes; and
   program code for appointing at least one specific node of the plurality to perform the specific functional role in the cluster, responsive to the calculated preference ratings indicating that the at least one specific node is best suited to perform the specific functional role, relative to the other nodes of the plurality.

20. A computer system for selecting at least one preferred node for a specific functional role in a cluster, the computer system comprising:
   a processor;
   memory;
   a parameter measuring module residing in the memory, for measuring, for each one of a plurality of nodes, at least one dynamic parameter, wherein the at least one dynamic parameter comprises at least connectivity to shared storage in the cluster, wherein connectivity is measured by determining how many of a total number of disks in the shared storage of the cluster are visible to each of the plurality of nodes;
   a weighting module residing in the memory, for applying weights to measured parameters concerning nodes, the applied weights affecting relative consequence of corresponding measured parameters in calculating preference ratings;
   a user preference value residing in the memory, for gleaning, for each one of the plurality of nodes, a user preference value quantifying the user's preference of each corresponding node for the specific functional role in the cluster, relative to the other nodes of the plurality; and
   a preference rating calculating module residing in the memory, for calculating a preference rating for each one of the plurality of nodes, based on at least the at least one measured dynamic parameter and the gleaned user preference value for the corresponding node, wherein the preference rating for each specific node indicates its suitability for the specific functional role in the cluster, relative to the other nodes of the plurality.

* * * * *